United States Patent
Jang et al.

(10) Patent No.: US 12,460,036 B2
(45) Date of Patent: Nov. 4, 2025

(54) METHOD FOR PRODUCING DIENE-BASED GRAFT COPOLYMER RESIN AND DIENE-BASED GRAFT COPOLYMER RESIN

(71) Applicant: LG CHEM, LTD., Seoul (KR)

(72) Inventors: Ji Uk Jang, Daejeon (KR); Dae Woo Lee, Daejeon (KR); Jae Bum Seo, Daejeon (KR); Jung Tae Park, Daejeon (KR); Gyu Sun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 705 days.

(21) Appl. No.: 17/609,223

(22) PCT Filed: Oct. 7, 2020

(86) PCT No.: PCT/KR2020/013663
§ 371 (c)(1),
(2) Date: Nov. 5, 2021

(87) PCT Pub. No.: WO2021/085883
PCT Pub. Date: May 6, 2021

(65) Prior Publication Data
US 2022/0213247 A1    Jul. 7, 2022

(30) Foreign Application Priority Data
Oct. 30, 2019 (KR) .................. 10-2019-0136201

(51) Int. Cl.
*C08F 279/04*     (2006.01)
*B29C 45/00*      (2006.01)
*C08F 6/00*       (2006.01)
*C08J 3/12*       (2006.01)

(52) U.S. Cl.
CPC ........ *C08F 279/04* (2013.01); *B29C 45/0001* (2013.01); *C08F 6/003* (2013.01); *C08J 3/12* (2013.01)

(58) Field of Classification Search
CPC .............................. C08F 279/04; C08K 5/098
See application file for complete search history.

(56) References Cited

U.S. PATENT DOCUMENTS

| | | | |
|---|---|---|---|
| 5,017,422 A | 5/1991 | Shumann et al. | |
| 5,210,132 A * | 5/1993 | Matsubara | C08F 291/02 525/313 |
| 5,412,036 A | 5/1995 | Traugott et al. | |
| 5,446,103 A | 8/1995 | Traugott et al. | |
| 2007/0142524 A1* | 6/2007 | Ryu | C08L 55/02 524/502 |
| 2010/0048798 A1 | 2/2010 | You et al. | |
| 2012/0309902 A1* | 12/2012 | Okabe | C08C 19/00 525/332.8 |
| 2017/0002121 A1 | 1/2017 | Thompson | |
| 2017/0275452 A1* | 9/2017 | Seo | C08F 279/02 |
| 2017/0349740 A1 | 12/2017 | Nishino et al. | |
| 2018/0142049 A1 | 5/2018 | Lee et al. | |
| 2018/0201707 A1 | 7/2018 | Seo et al. | |
| 2018/0273749 A1 | 9/2018 | Shindo et al. | |
| 2019/0062484 A1 | 2/2019 | Jang et al. | |
| 2019/0185606 A1 | 6/2019 | Jung et al. | |
| 2019/0233568 A1 | 8/2019 | Kim et al. | |
| 2020/0199275 A1 | 6/2020 | Thompson | |
| 2021/0122857 A1 | 4/2021 | Thompson | |

FOREIGN PATENT DOCUMENTS

| | | | |
|---|---|---|---|
| CN | 106232710 A | 12/2016 | |
| CN | 108779219 A | 11/2018 | |
| EP | 2157129 A1 | 2/2010 | |
| EP | 3176193 A1 | 6/2017 | |
| EP | 3279226 A1 | 2/2018 | |
| EP | 3296332 A1 | 3/2018 | |
| EP | 3409702 A1 | 12/2018 | |
| EP | 3434732 A1 | 1/2019 | |
| EP | 3505544 A1 | 7/2019 | |
| JP | 2005-82717 A | 3/2005 | |
| KR | 10-2002-0048642 A | 6/2002 | |
| KR | 10-2003-0031684 A | 4/2003 | |
| KR | 100385722 * | 5/2003 | |
| KR | 10-0415151 B1 | 1/2004 | |
| KR | 10-2007-0019301 A | 2/2007 | |
| KR | 10-0769249 B1 | 10/2007 | |
| KR | 10-2008-0036805 A | 4/2008 | |
| KR | 10-2013-0033175 A | 4/2013 | |
| KR | 10-2016-0118245 A | 10/2016 | |
| WO | WO-0196469 A1 * | 12/2001 | ............ C08F 279/02 |

OTHER PUBLICATIONS

Translation of KR 100385722 (Year: 2003).*
International Search Report issued in corresponding International Patent Application No. PCT/KR2020/013663 dated Jan. 18, 2021.
Search report issued in corresponding European Patent Application No. 20881114.1 on Jun. 3, 2022, 9 pages.
Office Action issued in corresponding Chinese Patent Application No. 202080031183.7, dated May 26, 2023.
Office Action issued in corresponding Korean Patent Application No. 10-2020-0129399, dated Feb. 22, 2023.

* cited by examiner

Primary Examiner — Robert C Boyle
(74) Attorney, Agent, or Firm — Morgan, Lewis & Bockius LLP

(57) ABSTRACT

Disclosed is a method for producing a diene-based graft copolymer resin, and a diene-based graft copolymer resin produced therefrom, the method including: adding, into a reactor, a polymerization solution containing a diene-based rubber polymer, an aromatic vinyl-based monomer, a vinyl cyan-based monomer, a polymerization initiator, and a reaction solvent, and polymerizing the polymerization solution to prepare a polymer; recovering a solution containing unreacted monomers and a reaction solvent from the polymerization solution, dispersing a releasing agent in the recovered solution, and then adding the solution into the front end of a volatilization tank; and removing the unreacted monomers and the reaction solvent from the volatilization tank.

6 Claims, No Drawings

METHOD FOR PRODUCING DIENE-BASED GRAFT COPOLYMER RESIN AND DIENE-BASED GRAFT COPOLYMER RESIN

TECHNICAL FIELD

Cross-Reference to Related Applications

The present invention claims the benefit of the priority of Korean Patent Application No. 10-2019-0136201, filed on Oct. 30, 2019, the disclosure of which is incorporated herein in its entirety by reference.

TECHNICAL FIELD

The present invention relates to a method for producing a diene-based graft copolymer resin and a diene-based graft copolymer resin, and more specifically, to a method for producing a diene-based graft copolymer resin, the method being capable of providing a resin having excellent releasability and an excellent color quality even after injection molding. Also, the present invention relates to a diene-based graft copolymer resin having excellent releasability and an excellent color quality even after injection molding.

BACKGROUND ART

A diene-based graft copolymer resin has excellent processability and excellent physical properties such as surface gloss, impact resistance, and chemical resistance, and thus has been widely used in various office machines, electric and electronic parts, the interior or exterior materials of cars, etc.

In recent years, injection molded articles produced by using the diene-based graft copolymer resin exhibit trends of complicated shapes and an increase in size, and it is required that cracks should not be generated in the complicated and size-increased injection molded articles and the surface quality of the injection molded articles should not be reduced. However, for the diene-based graft copolymer resin produced by a typical production method, there is a limitation of deteriorating the quality of the injection molded articles due to the releasability of the resin.

To solve the limitation, a method, in which a releasing agent is added in a compound process for mixing a resin and raw materials other than the resin before the injection molding, has been carried out, but this method has a limitation of deteriorating the color quality of the diene-based graft copolymer resin.

Thus, there is a need for a method for producing a diene-based graft copolymer resin which can provide a resin having excellent releasability and an excellent color quality even after injection molding.

PRIOR ART DOCUMENTS

Patent Document (Patent Document 1) KR10-2002-0048642A

DISCLOSURE OF THE INVENTION

Technical Problem

An aspect of the present invention provides a method for producing a diene-based graft copolymer resin, the method being capable of providing a resin having excellent releasability and an excellent color quality even after injection molding.

Another aspect of the present invention provides a diene-based graft copolymer resin having excellent releasability and an excellent color quality even after injection molding.

However, the purpose of the present invention is not limited to the aforementioned, but other purposes not described herein will be clearly understood by those skilled in the art from descriptions below.

Technical Solution

According to an aspect of the present invention, there is provided a method for producing a diene-based graft copolymer resin, the method including: adding, into a reactor, a polymerization solution containing a diene-based rubber polymer, an aromatic vinyl-based monomer, a vinyl cyan-based monomer, an polymerization initiator, and a reaction solvent and polymerizing the polymerization solution to prepare a polymer; recovering a solution containing unreacted monomers and a reaction solvent from the polymerization solution, dispersing a releasing agent in the recovered solution, and then adding the solution into the front end of a volatilization tank; and removing the unreacted monomers and the reaction solvent from the volatilization tank.

According to another aspect of the present invention, there is provided a diene-based graft copolymer resin formed by graft-polymerizing an aromatic vinyl-based monomer and a vinyl cyan-based monomer to a diene-based rubber polymer, in which a force (an ejecting force), which is required to push an injection molded article from a mold when the resin is injection-molded, is 1,450 N or less.

Advantageous Effects

A method for producing a diene-based graft copolymer resin according to an embodiment of the present invention can provide a diene-based graft copolymer resin having excellent releasability and an excellent color quality even after injection molding.

A diene-based graft copolymer resin according to another embodiment of the present invention may have excellent releasability and an excellent color quality even after injection molding.

MODE FOR CARRYING OUT THE INVENTION

Terms or words used in this specification should not be restrictively interpreted as ordinary meanings or dictionary-based meanings, but should be interpreted as meanings and concepts conforming to the technical spirit of the present invention, based on the principle that an inventor can properly define the concept of a term to explain the invention in the best ways.

Throughout the present specification, when it is described that a portion "comprises" or "includes" some elements, it is not meant as the exclusion of the other components but to implies the further inclusion of the other components, unless explicitly stated to the contrary.

Hereinafter, the present invention will be described in more detail to aid in understanding the present invention.

An aspect of the present invention provides a method for producing a diene-based graft copolymer resin, the method including: (A) adding, into a reactor, a polymerization solution containing a diene-based rubber polymer, an aromatic vinyl-based monomer, a vinyl cyan-based monomer, a polymerization initiator, and a reaction solvent, and polymerizing the polymerization solution to prepare a polymer; (B) recovering a solution containing unreacted monomers and a reaction solvent from the polymerization solution, dispersing a releasing agent in the recovered solution, and then adding the solution into the front end of a volatilization tank; and (C) removing the unreacted monomers and the reaction solvent from the volatilization tank.

Hereinafter, a method for producing a diene-based graft copolymer resin according to an embodiment of the present invention will be described in more detail for each step.

1. Step (A)

An embodiment of the present invention includes adding, into a reactor, a polymerization solution containing a diene-based rubber polymer, an aromatic vinyl-based monomer, a vinyl cyan-based monomer, a polymerization initiator, and a reaction solvent, and polymerizing the polymerization solution to prepare a polymer.

The diene-based rubber polymer may be a polymer of a diene-based monomer, the diene-based monomer may be at least one selected from among 1,3-butadiene, isoprene, chloroprene, and piperylene, and specifically, the diene-based monomer may be 1,3-butadiene. That is, the diene-based rubber polymer may be polybutadiene.

The diene-based rubber polymer may be included in an amount of 5-20 parts by weight with respect to 100 parts by weight of the polymerization solution. Specifically, the diene-based rubber polymer may be included in an amount of 5-10 parts by weight with respect to 100 parts by weight of the polymerization solution. If the amount of the diene-based rubber polymer is within the above range, the diene-based rubber polymer may be easily dissolved in the reaction solvent, and thus the diene-based rubber polymer may easily participate in the polymerization, and the impact resistance of the diene-based graft copolymer resin may be improved.

The aromatic vinyl-based monomer may be at least one selected from among styrene, α-methyl styrene, α-ethyl styrene, and p-methyl styrene, and specifically, the aromatic vinyl-based monomer may be styrene.

The aromatic vinyl-based monomer may be included in an amount of 40-60 parts by weight with respect to 100 parts by weight of the polymerization solution. Specifically, the aromatic vinyl-based monomer may be included in an amount of 40-50 parts by weight, 45-50 parts by weight, or 45-55 parts by weight with respect to 100 parts by weight of the polymerization solution. If the amount of the aromatic vinyl-based monomer is within the above range, the processability of the diene-based graft copolymer resin may be further improved.

The vinyl cyan-based monomer may be at least one selected from among acrylonitrile, methacrylonitrile, phenylacrylonitrile and α-chloroacrylonitrile, and specifically, the vinyl cyan-based monomer may be acrylonitrile.

The vinyl cyan-based monomer may be included in an amount of 10-30 parts by weight with respect to 100 parts by weight of the polymerization solution. Specifically, the aromatic vinyl-based monomer may be included in an amount of 20-30 parts by weight, 10-25 parts by weight, or 20-25 parts by weight with respect to 100 parts by weight of the polymerization solution. If the amount of the aromatic vinyl-based monomer is within the above range, the chemical resistance of the diene-based graft copolymer resin may be further improved.

The reaction solvent may be at least one selected from among ethylbenzene, toluene, xylene, and methylethylketone, and specifically, the reaction solution may be ethylbenzene.

The reaction solvent may be included in an amount of 10-30 parts by weight with respect to 100 parts by weight of the polymerization solution. Specifically, the reaction solvent may be included in an amount of 10-25 parts by weight, 15-25 parts by weight, or 15-30 parts by weight with respect to 100 parts by weight of the polymerization solution. If the amount of the reaction solvent is within the above range, the polymerization solution may have suitable viscosity and the polymerization reaction may be easily carried out.

The polymerization initiator may be at least one selected from among t-butylperoxy-2-ethylhexanoate, azobisisobutyronitrile, benzoyl peroxide, cumyl peroxide and t-butyl peroxide, 1,1-di(t-butylperoxy)cyclohexane, and specifically, the polymerization initiator may be t-butylperoxy-2-ethylhexanoate.

The polymerization initiator may be included in an amount of 0.001-0.005 parts by weight, or 0.0025-0.005 parts by weight with respect to 100 parts by weight of the polymerization solution. If the amount of the polymerization initiator is within the above range, the polymerization may be easily carried out.

The polymerization solution may further include a molecular weight control agent. The molecular weight control agent may be at least one selected from among t-dodecyl mercaptan, n-dodecyl mercaptan, n-octyl mercaptan and α-methylstyrene dimer, and specifically, may be at least one selected from among t-dodecyl mercaptan and α-methylstyrene dimer.

The molecular weight control agent may be included in an amount of 0.001-0.01 parts by weight, or 0.005-0.01 parts by weight with respect to 100 parts by weight of the polymerization solution. If the amount of the molecular weight control agent is within the above range, the molecular weight control agent may serve as a reaction accelerator while maintaining the polymerization rate appropriately.

According to an embodiment of the present invention, the reactor may include a plurality of reaction zones having different temperatures. Specifically, the reactor may include two or more reaction zones having different temperatures, and more specifically, the reactor may include two reaction zones having different temperatures. If the reactor includes a plurality of reaction zones having different temperatures, a degree of polymerization of a polymer may be easily controlled.

According to an embodiment of the present invention, the reactor may include a first reaction zone having a temperature of 100° C. to 120° C. and a second reaction zone having a temperature of 120° C. to 140° C. If the reactor includes the first and second reaction zones and the temperature of each reaction zone is within the above range, the diene-based graft copolymer resin having excellent impact strength and chemical resistance may be produced.

Meanwhile, when a molecular weight control agent is included in the polymerization solution, the molecular weight control agent may be added at the front end of the second reaction zone, and thus the polymerization rate may be maintained properly, thereby producing a diene-based graft copolymer resin having excellent physical properties.

2. Step (B)

An embodiment of the present invention includes recovering a solution containing unreacted monomers and a reaction solvent from the polymerization solution, dispersing a releasing agent in the recovered solution, and then adding the solution into the front end of a volatilization tank.

An embodiment of the present invention can produce a diene-based graft copolymer resin having excellent releasability and excellent color quality even after injection molding, not by carrying out a method in which the releasing agent is included in the polymerization solution or the releasing agent is added in a compound process, but by dispersing the releasing agent in the solution recovered from the polymerization solution and then adding the solution into the front end of a volatilization tank.

According to an embodiment of the present invention, the releasing agent may be added in an amount such that 500-3,000 ppm are included in the diene-based graft copolymer resin. Specifically, the releasing agent may be added in an amount such that 500-3,000 ppm, 500-2,500 ppm, 1,000-2,500 ppm, or 1,000-2,000 ppm are included in the diene-based graft copolymer resin. If the releasing agent is added to be included within an amount of the above range in the diene-based graft copolymer resin, the resin produced according to an embodiment of the present invention may have excellent releasability and an excellent color quality even after injection molding.

According to an embodiment of the present invention, the releasing agent may be at least one selected from among calcium stearate, zinc stearate, and magnesium stearate. The releasing agent may be, specifically, calcium stearate, and in this case, there is an effect of securing both the improvement of releasability and the reduction of a discoloration degree.

3. Step (c)

An embodiment of the present invention includes removing the unreacted monomers and the reaction solvent from the volatilization tank. This is for removing impurities other than the diene-based graft copolymer resin.

According to an embodiment of the present invention, the removing of the unreacted monomers and the reaction solvent from the volatilization tank may be carried out at a temperature of 200° C. to 300° C. The removing of the unreacted monomers and the reaction solvent from the volatilization tank may be carried out at a temperature of 200° C. to 250° C. or 200° C. to 240° C. under a pressure of 10 torr to 100 torr. In this case, the unreacted monomers and the reaction solvent may be maximally removed.

According to an embodiment of the present invention, the method for producing a diene-based graft copolymer resin according to an embodiment of the present invention may further include excluding the diene-based graft copolymer resin, and thus a pellet-type diene-based graft copolymer resin may be produced.

Another embodiment of the present invention provides a diene-based graft copolymer resin formed by graft-polymerizing an aromatic vinyl-based monomer and a vinyl cyan-based monomer to a diene-based rubber polymer, in which a force (an ejecting force), which is required to push an injection molded article from a mold when the resin is injection-molded, is 1,450 N or less. As a specific example, the diene-based graft copolymer resin may have an ejecting force of 1,450 N or less, 1,400 N or less, 1,350 N or less, 1,300 N or less, or 1,000 N to 1,300 N, and when this range is satisfied, the releasability of the diene-based graft copolymer resin may be considered excellent.

The aromatic vinyl-based monomer may be at least one selected from among styrene, α-methyl styrene, α-ethyl styrene, and p-methyl styrene, and specifically, the aromatic vinyl-based monomer may be styrene.

The diene-based rubber polymer may be a polymer of a diene-based monomer, the diene-based monomer may be at least one selected from among 1,3-butadiene, isoprene, chloroprene, and piperylene, and specifically, the diene-based monomer may be 1,3-butadiene.

The vinyl cyan-based monomer may be at least one selected from among acrylonitrile, methacrylonitrile, phenylacrylonitrile and α-chloroacrylonitrile, and specifically, the vinyl cyan-based monomer may be acrylonitrile.

According to an embodiment of the present invention, the diene-based graft copolymer resin may have a discoloration degree calculated by Equation 1 below of 7.0 or less, 6.5 or less, 6.0 or less, 5.5 or less, 5.0 or less, 4.5 or less, 3.5 or less, specifically, 3.2 or less. In this case, the diene-based graft copolymer resin may have an excellent color quality even after injection molding. In addition, discoloration by heat may be small, and durability such as weather resistance and heat resistance may be excellent.

$$\Delta E = \sqrt{(L-L')^2 + (a-a')^2 + (b-b')^2} \qquad \text{[Equation 1]}$$

In Equation 1 above, L, a, and b values may be color L, a, and b values of a specimen prepared by putting the resin into a 250° C. injection machine and injection-molding the resin without a residence time, and L', a', and b' values may be color L', a', and b' values of a specimen prepared by putting a resin into a 250° C. injection machine, staying for 15 minutes, and then injection-molding the resin.

Hereinafter, the present invention will be described in more detail according to examples. However, examples according to the present invention may be modified in various other forms, and the scope of the present invention should not be interpreted to be limited to the examples described below. Rather, the examples of the present specification are provided so that this description will be thorough and complete, and will fully convey the scope of the present invention to those skilled in the art.

Example 1

Ethylbenzene (Sigma-Aldrich, 25.0 parts by mass) as a reaction solvent, styrene monomers (Sigma-Aldrich, 47.6 parts by mass), acrylonitrile monomers (Sigma-Aldrich, 20.4 parts by mass), polybutadiene rubber (Asahi, 730AX, 7 parts by weight), and t-butylperoxy-2-ethylhexanoate (Sigma-Aldrich, 0.0025 parts by mass) as a polymerization initiator were mixed to prepare a polymerization solution.

The polymerization solution was continuously added into a reactor at a rate of 12 kg/hr and primarily polymerized in a first reaction zone having a temperature of 105° C., and t-dodecyl mercaptan (Sigma-Aldrich, 0.005 parts by weight) as a molecular weight control agent was added at the front end of a second reaction zone, and then secondarily polymerized in the second reaction zone having a temperature of 130° C. to prepare a polymer.

A solution containing unreacted monomers and a reaction solvent was recovered from the polymerization solution, calcium stearate (Sigma-Aldrich) as a releasing agent was dispersed in the recovered solution, and then the recovered solution dispersed with the releasing agent was continuously added into the front end of a volatilization tank at a rate of 0.012 kg/hr.

In addition, the unreacted monomers and the reaction solvent were removed at a temperature of 240° C. under a pressure of 10 torr from the volatilization tank, and the polymer was extruded to produce a pellet-type acrylonitrile-butadiene-styrene copolymer resin.

Meanwhile, the calcium stearate was added to be included in an amount of 1,000 ppm in the resin.

Example 2

A pellet-type acrylonitrile-butadiene-styrene copolymer resin was produced by performing the same manner as in Example 1 except that in Example 1, calcium stearate was added to be included in an amount of 2,000 ppm in the resin.

Example 3

A pellet-type acrylonitrile-butadiene-styrene copolymer resin was produced by performing the same manner as in Example 1 except that in Example 1, calcium stearate was added to be included in an amount of 800 ppm in the resin.

Example 4

A pellet-type acrylonitrile-butadiene-styrene copolymer resin was produced by performing the same manner as in Example 1 except that in Example 1, zinc stearate instead of calcium stearate was added to be included in an amount of 1,000 ppm in the resin.

Example 5

A pellet-type acrylonitrile-butadiene-styrene copolymer resin was produced by performing the same manner as in Example 1 except that in Example 1, magnesium-stearate instead of calcium-stearate was added to be included in an amount of 1,000 ppm in the resin.

Example 6

A pellet-type acrylonitrile-butadiene-styrene copolymer resin was produced by performing the same manner as in Example 1 except that in Example 1, calcium stearate was added to be included in an amount of 1,500 ppm in the resin.

Example 7

A pellet-type acrylonitrile-butadiene-styrene copolymer resin was produced by performing the same manner as in Example 1 except that in Example 1, calcium stearate was added to be included in an amount of 500 ppm in the resin.

Example 8

A pellet-type acrylonitrile-butadiene-styrene copolymer resin was produced by performing the same manner as in Example 1 except that in Example 1, calcium stearate was added to be included in an amount of 2,500 ppm in the resin.

Comparative Example 1

Ethylbenzene (25.0 parts by mass) as a reaction solvent, styrene monomers (47.6 parts by mass), acrylonitrile monomers (20.4 parts by mass), polybutadiene rubber (7 parts by weight), and t-butylperoxy-2-ethylhexanoate (0.0025 parts by mass) as a polymerization initiator were mixed to prepare a polymerization solution.

The polymerization solution was continuously added into a reactor at a rate of 16 L/hr and primarily polymerized in a first reaction zone having a temperature of 105° C., and t-dodecyl mercaptan (0.005 parts by weight) as a molecular weight control agent was added at the front end of a second reaction zone, and then secondarily polymerized in the second reaction zone having a temperature of 130° C. to prepare a polymer.

In addition, the unreacted monomers and the reaction solvent were removed at a temperature of 240° C. under a pressure of 10 torr from the volatilization tank, and the polymer was extruded to produce a pellet-type acrylonitrile-butadiene-styrene copolymer resin.

Comparative Example 2

The acrylonitrile-butadiene-styrene copolymer resin produced in Comparative Example 1 above and calcium stearate were compounded and then extruded at 240° C. to produce a pellet-type acrylonitrile-butadiene-styrene copolymer resin. In this case, the calcium stearate was added to be included in an amount of 1,000 ppm with respect to the resin.

Comparative Example 3

A pellet-type acrylonitrile-butadiene-styrene copolymer resin was produced in the same manner as in Example except that the recovered solution dispersed with the releasing agent was added not into the front end of the volatilization tank but into the front end of the reactor.

EXPERIMENTAL EXAMPLES

To perform a comparative analysis of characteristics of each resin produced in Examples 1 to 8 and Comparative Examples 1 and 3 above, the analysis below was carried out, and the results are shown in Tables 1 and 2 below.

1) Measurement of Ejecting Force (N)

When the pellet-type resins produced in Examples 1 to 8 and Comparative Examples 1 to 3 were injection-molded in a 240° C. injection molding machine (TE110, WOOJIN Plaimm Co. Ltd.), a force required to push a cup-shaped specimen molded in a cup mold was measured by using a KISTLER sensor.

2) Evaluation of Discoloration Degree ($\Delta E$)

Color L, a, and b values of specimens prepared by putting the pellet-type resins produced in Examples 1 to 8 and Comparison Examples 1 to 3 in a 250° C. injection machine and injection-molding the resins without a residence time were measured by using a color difference meter (S&M Colour Meter SM-T, Dainan Tech Pte., Ltd.), and color L', a', and b' values of specimens prepared by putting the pellet-type resins produced in Examples and Comparative Examples into a 250° C. injection machine, staying for 15 minutes, and then injection-molding the resins were measured.

In addition, the discoloration degree was calculated by means of Equation 1 below.

$$\Delta E = \sqrt{(L-L')^2 + (a-a')^2 + (b-b')^2} \qquad \text{[Equation 1]}$$

3) Measurement of Izod Impact Strength (kg·cm/cm, Notched, ¼")

According to ASTM D256, Izod impact strengths of specimens prepared by injection-molding the pellet-type resins produced in Examples and Comparative Examples were measured at 23° C.

4) Measurement of Softening Point (° C.)

According to ASTM D1525, softening points of specimens prepared by injection-molding the pellet-type resins produced in Examples and Comparative Examples were measured.

TABLE 1

| Division | Examples | | | | | | | |
|---|---|---|---|---|---|---|---|---|
| | 1 | 2 | 3 | 4 | 5 | 6 | 7 | 8 |
| Ejecting force (N) | 1,300 | 1,200 | 1,350 | 1,150 | 1,200 | 1,100 | 1,450 | 1,000 |
| Color b' | −2 | −1 | −2 | 2 | 1 | −1 | −3 | 1 |
| Discoloration degree ($\Delta E$) | 3.2 | 3.5 | 3.3 | 7.0 | 6.5 | 3.5 | 3.0 | 4.4 |
| Izod impact strength (kg · cm/cm) | 15.4 | 15.5 | 15.3 | 15.1 | 14.8 | 15.2 | 15.5 | 15.0 |
| Softening point (° C.) | 98.8 | 98.7 | 98.8 | 98.6 | 98.4 | 98.6 | 99.4 | 97.8 |

TABLE 2

| Division | Comparative examples | | |
|---|---|---|---|
| | 1 | 2 | 3 |
| Ejecting force (N) | 1,600 | 1,300 | 1,500 |
| Color b' | −2 | 3 | −2 |
| Discoloration degree ($\Delta E$) | 3.1 | 4.6 | 3.3 |
| Izod impact strength (kg · cm/cm) | 15.1 | 15.4 | 15.2 |
| Softening point (° C.) | 98.8 | 98.8 | 98.8 |

Referring to Tables 1 and 2, it may be confirmed that the diene-based graft copolymer resins of Examples 1 to 8 produced according to the present invention maintain an equivalent or higher level of impact strengths and softening points compared to those of Comparative Examples as well as have excellent releasability and an excellent color quality even after injection molding.

Specifically, it may be confirmed that the diene-based graft copolymer resins produced in Examples 1 to 3 and 6 not only have low ejecting forces but also prevent discoloration degrees from increasing. In addition, it may be confirmed that for Examples 4 and 5 in which different kinds of releasing agents were used, discoloration degrees increased, but ejecting forces may be reduced significantly. Further, it may be confirmed that for Example 6 in which the content of the releasing agent was lowered, the improvement of an ejecting force was a little slight, but a discoloration degree may be minimized, and for Example 7 in which the content of the releasing agent was raised, an ejecting force may be minimized. From such results, it may be confirmed that in order to improve both a discoloration degree and releasability according to an ejecting force, there is a need for appropriately controlling the kinds and content of releasing agents.

On the contrary, it may be confirmed that Comparative Example 1, in which a releasing agent was not added, has a very high ejecting force and thus very poor releasability, and Comparative Example 2, in which a releasing agent was simply mixed during the compounding, may reduce an ejecting force slightly, but shows a large increase in a discoloration degree as compared to the reduction of the ejecting force. In addition, it may be confirmed that Comparative Example 3, in which a releasing agent was added when the resin was polymerized, does not exhibit an effect of reducing an ejecting force due to the releasing agent.

Thus, it may be seen that a method for producing a diene-based graft copolymer resin according to an embodiment of the present invention can provide a diene-based graft copolymer resin having excellent releasability and an excellent color quality even after injection molding at a high temperature.

The invention claimed is:

1. A method for producing a diene-based graft copolymer resin, the method comprising:
adding, into a reactor, a polymerization solution comprising a diene-based rubber polymer, an aromatic vinyl-based monomer, a vinyl cyan-based monomer, a polymerization initiator, and a reaction solvent, and polymerizing the polymerization solution to prepare a polymer;
recovering a solution comprising unreacted monomers and a reaction solvent from the polymerization solution, dispersing a releasing agent in a recovered solution, and then adding the solution into the front end of a volatilization tank; and
removing the unreacted monomers and the reaction solvent from the volatilization tank,
wherein the removing of the unreacted monomers and the reaction solvent from the volatilization tank is carried out at a temperature of 200° C. to 300° C. under a pressure of 10 torr to 100 torr,
wherein the diene-based rubber polymer includes a polymer of a diene-based monomer,
wherein the diene-based monomer includes at least one selected from among 1,3-butadiene, isoprene, chloroprene, and piperylene,
wherein the aromatic vinyl-based monomer includes at least one selected from among styrene, α-methyl styrene, α-ethyl styrene, and p-methyl styrene,
wherein the vinyl cyan-based monomer includes at least one selected from among acrylonitrile, methacrylonitrile, phenylacrylonitrile and α-chloroacrylonitrile, and
wherein the releasing agent includes calcium stearate.

2. The method of claim 1, wherein the diene-based graft copolymer resin comprises the releasing agent in an amount of 500-3,000 ppm.

3. The method of claim 1, wherein the reactor comprises a plurality of reaction zones having different temperatures.

4. The method of claim 3, wherein the reactor comprises a first reaction zone having a temperature of 100° C. to 120° C. and a second reaction zone having a temperature of 120° C. to 140° C.

5. The method of claim 1, further comprising extruding the diene-based graft copolymer resin, wherein the diene-based graft copolymer resin is in a pellet type.

6. The method of claim 1, wherein the removing of the unreacted monomers and the reaction solvent from the volatilization tank is carried out at a temperature of 200° C. to 250° C.,
wherein the diene-based monomer includes 1,3-butadiene, wherein the aromatic vinyl-based monomer includes styrene, and wherein the vinyl cyan-based monomer includes acrylonitrile.

\* \* \* \* \*